United States Patent [19]

Nightingale et al.

[11] Patent Number: 5,263,081
[45] Date of Patent: Nov. 16, 1993

[54] METHOD AND APPARATUS FOR PROVIDING ON-HOOK TRANSMISSION FOR DIGITAL LOOP CARRIER CHANNEL UNITS

[75] Inventors: Roger A. Nightingale, Fairfax; Makan Abousaeedi, Reston; Winston M. Gadsby, Herndon, all of Va.

[73] Assignee: Hubbell Incorporated, Orange, Conn.

[21] Appl. No.: 978,025

[22] Filed: Nov. 18, 1992

Related U.S. Application Data

[63] Continuation of Ser. No. 837,708, Feb. 20, 1992, abandoned, which is a continuation of Ser. No. 430,156, Nov. 1, 1989, abandoned.

[51] Int. Cl.⁵ ............................................. H04M 1/00
[52] U.S. Cl. ........................................... 379/90; 379/93; 379/97; 379/236; 379/377
[58] Field of Search ............... 379/93, 90, 142, 97, 379/236, 377; 370/76, 110.1

[56] References Cited

U.S. PATENT DOCUMENTS

| | | | |
|---|---|---|---|
| 3,721,768 | 3/1973 | Mazac et al. | 379/382 |
| 4,221,936 | 9/1980 | Vaughan | 379/377 |
| 4,283,604 | 8/1981 | Chambers, Jr. | 379/405 |
| 4,326,104 | 4/1982 | Bergida | 379/377 |
| 4,383,138 | 5/1983 | Castro et al. | 379/373 |
| 4,551,581 | 11/1985 | Doughty | 379/94 |
| 4,563,547 | 1/1986 | Booth | 379/342 |
| 4,850,011 | 7/1989 | Delmege et al. | 379/157 |
| 4,852,157 | 7/1989 | Tyrell | 379/236 |
| 4,864,598 | 9/1989 | Lynch et al. | 379/27 |
| 4,872,198 | 10/1989 | Sues et al. | 370/110.1 |
| 4,873,719 | 10/1989 | Reese | 379/215 |
| 4,878,048 | 10/1989 | Gottesman et al. | 379/27 |
| 4,901,344 | 2/1990 | Monette et al. | 379/93 |
| 4,903,292 | 2/1990 | Dillon | 379/93 |
| 4,922,490 | 5/1990 | Blakley | 370/110.1 |

OTHER PUBLICATIONS

Bellcore, "SPCS Customer Premises Equipment Data Interface", Technical Reference TR-TSY-000030 Issue 1, Nov. 1988, pp. ii–vi and pp. 1–13.

Primary Examiner—James L. Dwyer
Assistant Examiner—Ahmad F. Matar
Attorney, Agent, or Firm—Jerry M. Presson; Walter C. Farley

[57] ABSTRACT

On-hook VF transmission through a channel unit to a subscriber telephone instrument is provided by a control unit which generates control signals for the channel unit. The control unit responds to receipt of an "idle" code by creating commands which establish a VF path through the channel unit regardless of whether the subscriber instrument is on-hook or off-hook.

17 Claims, 7 Drawing Sheets

DIGITAL SIGNALING INFORMATION FOR POTS-TYPE CHANNEL UNITS

| CHANNEL UNIT TYPE | DIGITAL CODES TRANSMITTED BY RT | | | DIGITAL CODES RECEIVED AT RT | | |
|---|---|---|---|---|---|---|
| | CHANNEL UNIT CONDITION | SUPERFRAME (TR-TSY-000008) A B | EXTENDED SUPERFRAME A B C D | CHANNEL UNIT CONDITION | SUPERFRAME (TR-TSY-000008) A B | EXTENDED SUPERFRAME A B C D |
| SINGLE PARTY CODES (LOOP START CHANNEL UNIT) | ON-HOOK | 0 0 | 0 0 0 0 | CHANNEL TEST | 0 1 | 0 1 0 1 |
| | OFF-HOOK | 1 0 | 1 0 1 0 | FWD DISCONNECT | 1 0 | 1 0 1 0 |
| | | | | IDLE | 1 1 | 1 1 1 1 |
| | | | | RINGING | 1 1/0 | 1 1 1 0 OR 1 0 1 1 |
| GROUND START CODES (GS/LS CHANNEL UNIT) | ON-HOOK | 0 0 | 0 0 0 0 | GROUND START | 0 0 | 0 0 0 0 |
| | RING GROUND | 0 1 | 0 1 0 1 | CHANNEL TEST | 0 1 | 0 1 0 1 |
| | OFF-HOOK | 1 0 | 1 0 1 0 | RINGING | 1 1/0 | 1 1 1 0 OR 1 0 1 1 |
| | | | | IDLE | 0 1/0 | 0 1 0 0 OR 0 0 0 1 |

METHOD AND APPARATUS FOR PROVIDING
ON-HOOK TRANSMISSION FOR DIGITAL LOOP
CARRIER CHANNEL UNITS

CROSS REFERENCE TO RELATED APPLICATIONS

This is a continuation of application Ser. No. 07/837,708 filed Feb. 20, 1992 (now abandoned) which was a continuation of application Ser. No. 07/430,156 filed Nov. 1, 1989 (now abandoned).

FIELD OF THE INVENTION

This invention relates to a method for improving the on-hook transmission response of SLC5 Remote Terminal (RT) Plain Old Telephone Service (POTS) type channel units to received standard SLC series 5 supervisory signaling codes.

BACKGROUND OF THE INVENTION

In the beginning, the telephone companies relayed voice frequency (VF) information over copper cables. As the demand for telephone lines increased and transmission technology improved, a means for digitally transmitting VF information was developed. The digital technology enabled twenty-four VF signals, i.e., the VF signals carried by 24 telephone lines, to be sampled and multiplexed into one DS-1 (1.544 Mb/s rate) digital line. The economical advantage of this is readily apparent. A fairly recent development of this digital advancement is the Digital Loop Carrier (DLC) system.

The DLC system is used in local switching services to connect the subscriber (or customer) to the local central office (CO). VF signals are converted to digital form for transmission over a digital transmission medium. In this digitizing process, supervisory signals are incorporated into the transmitted signal in the form of codes in standardized formats which provide to the receiving end of the medium information about the status of or commands from the other end.

In the overall communication process it is possible to provide two modes of transmission, off-hook and on-hook. Off-hook transmission is defined as transmission during the period the subscriber's equipment is requesting service, has closed the loop, or has seized a telephone line. On-hook transmission (OHT) is defined as transmission during the period before the subscriber has gone off-hook. OHT is essential for providing certain services, such as calling party identification (CPI) and other features. However, RT equipment of the prior art is not capable of providing OHT under all circumstances or in response to all supervisory signaling codes.

SUMMARY OF THE INVENTION

An object of the present invention is to provide a method of arranging and operating a POTS-type RT channel unit for use in a SLC series 5 DLC system which maintains OHT while receiving the "Ground Start - Idle" code to make the system fully compatible with the requirements of Bellcore TR-TSY-000030.

Briefly described, the invention includes providing a control means in the remote terminal for passing signals in both directions, and generating with that control means control signals responsive to "Ground Start - Idle" codes to energize apparatus for completing VF connections through the RT, thereby allowing OHT.

In order to impart full understanding of the manner in which these and other objects are attained in accordance with the invention, a particularly advantageous embodiment thereof will be described with reference to the accompanying drawings, which form a part of this specification, and wherein:

DESCRIPTION OF THE PREFERRED EMBODIMENT

There are two basic DLC configurations: the universal configuration and the integrated configuration.

Figure 1:
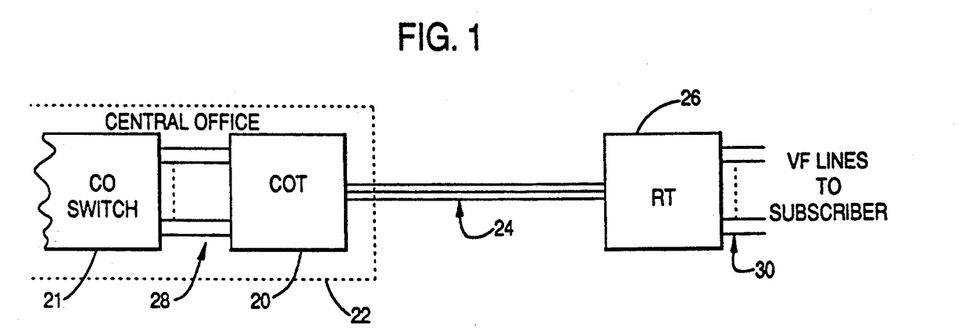
FIG. 1 is a schematic block diagram of a digital loop carrier (DLC) system in universal configuration.

In the universal configuration, a block diagram of which is shown in FIG. 1, a Central Office Terminal (COT) 20 located at the central office (CO) 22 is connected to the analog port of a central office switch 21 and is also connected by a digital transmission medium 24 (DS-1 interface to T1, optical fiber or the like) to a Remote Terminal (RT) 26 located in the vicinity of the subscriber. VF copper lines indicated generally at 28 from the CO switching system analog port are routed to the COT. The COT performs an analog to digital (A-D) conversion on the VF signals and multiplexes them for DS-1 transmission on the digital medium to the RT. The RT demultiplexes the digital signal and carries out a digital to analog (D-A) conversion. The resultant VF signals are routed via copper lines indicated generally at 30 to the subscribers. VF signals from the subscribers arrive at the CO switch analog port in a similar manner.

Figure 2:
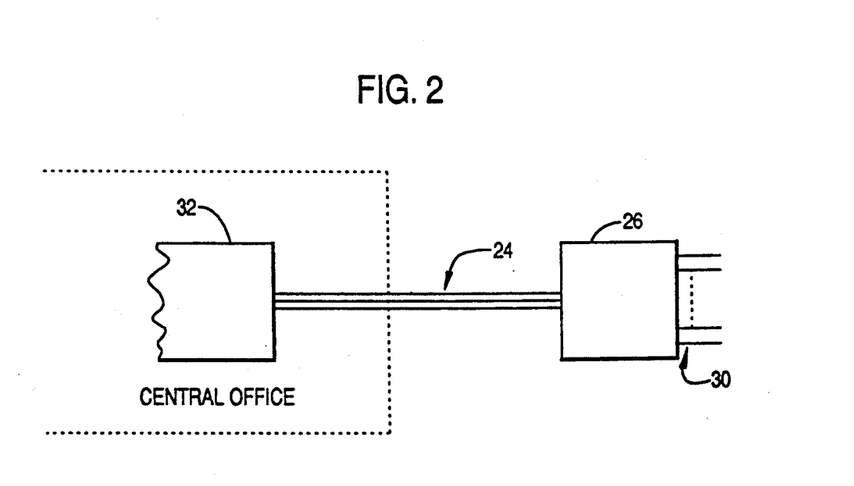
FIG. 2 is a schematic block diagram of a digital loop carrier (DLC) system in integrated configuration.

In an integrated configuration, a block diagram of which is shown in FIG. 2, an RT 26 is directly linked to the digital port of a CO digital switching system 32 via the digital transmission medium 24. VF information which is already in digital format at the CO switching system digital port can be sent on medium 24 directly to the RT where a D-A conversion takes place. The resultant VF signals are sent on copper lines 30 to the subscribers. VF signals generated by the subscriber are converted to digital format at the RT and forwarded to the CO switching system digital port via the digital transmission medium. In this form of the system, no channel bank equipment is needed at the CO end of the link because the information is all digital, in and out. The CO facility may, of course, also have separate equipment for handling analog inputs.

The COT (in the universal configuration) and the RT include channel banks. Physically, the channel banks consist of multiple slotted shelves designed to accommodate plug-in channel units and common equipment units. Functionally, the channel units interface the subscriber or CO VF signals with the common equipment, and the common equipment interfaces the digital facility with the channel units. Twenty-four channel samples are multiplexed onto one digital line and are known as a digroup.

Figure 3:
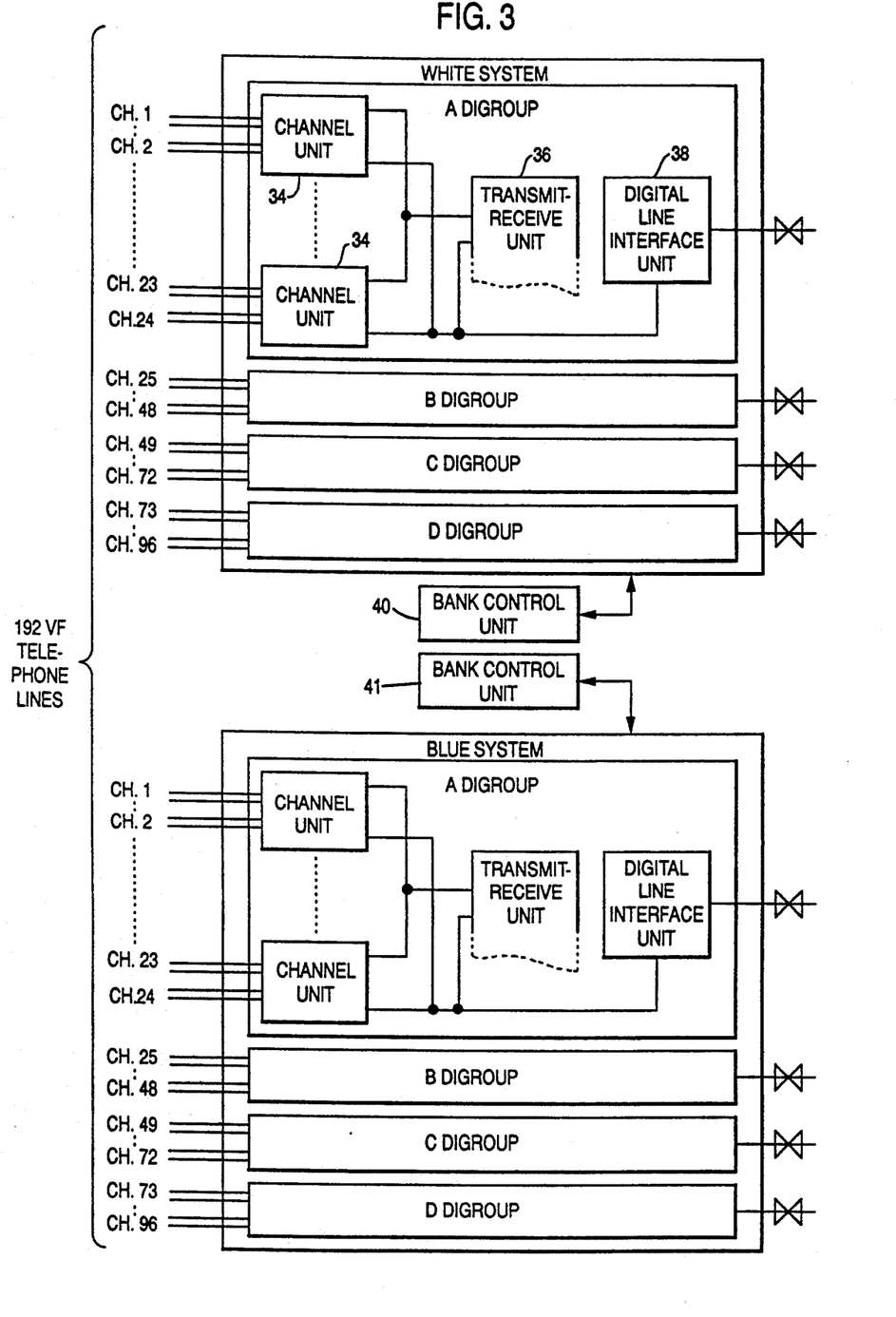
FIG. 3 is a simplified schematic block diagram of a typical Series 5 channel bank.

FIG. 3 shows a basic, simplified functional block schematic diagram of a typical channel bank. Various types of channel units and common equipment are used to suit the types of service offered the subscriber, and to suit the method of digital transmission. In the channel bank illustrated therein, a total of 192 VF telephone lines are connected to two system groups identified as the white and blue systems, 96 lines going to each system. In each system are four digroups identified as A, B, C and D. Within each digroup (digroup A of the white system being used as an example) are 12 channel units 34, each of which receives two telephone lines consisting of a pair of wires. The outputs of the channel units are connected to the input of a transmit-receive unit (TRU) 36 (each one of which is shared by a pair of digroups) which accomplishes the multiplexing necessary to prepare the signals for transmission and provides the necessary timing signals. The multiplexed signals are connected through a digital line interface unit (LIU) 38 onto the digital line. Bank control units 40 and 41 monitor and supervise the white and blue systems, respectively, for correct operation.

Channel units known as POTS-type units provide VF 2-wire local service between a CO and a subscriber and have two basic modes of transmission: off-hook transmission and on-hook transmission (OHT).

As indicated above, off-hook transmission is transmission during the period the subscriber is requesting service, has closed the loop, or has seized a telephone line, and on-hook transmission (OHT) is transmission during the period before the subscriber has gone off-hook.

Two DC supervisory signaling methods are employed in order to allow the subscriber equipment to request service on POTS-type telephone lines and the nature of these signaling methods should be understood in conjunction with the transmission types and the signaling codes. The DC supervisory signaling methods are Loop Start (LS) and Ground Start (GS).

In Loop Start, the subscriber equipment signals the CO of a line request by closing the loop with a DC termination. LS signaling is usually used with, but is not limited to, single party services operating into conventional telephones and key set systems.

In Ground Start, the subscriber signals the CO of a line request by grounding one leg of the telephone line and subsequently closing the loop with a DC termination. GS signaling is usually used with, but is not limited to, private branch exchanges (PBX), wide area telephone service (WATS) lines, and WATS trunks operating into a local CO (end office).

DC supervisory signaling is easily accomplished when the subscriber and CO are directly linked by a metallic pair (copper cables). However, in a DLC system, the channel unit at the COT or RT has to recognize the DC supervisory signaling on the VF line, encode it and digitally transmit the codes to the far end. The far end channel unit must decode this information to produce the correct DC signaling state on the associated VF line. Some of the digital codes result in channel unit internal activity which may result in the VF interface being powered down or the voice path disabled, or the like. Following is a brief description of the codes and how they are arranged.

As previously stated, twenty-four VF channels are sampled and multiplexed onto a digital line. Each channel sample contains eight contiguous bits, and the consecutive bits from the twenty four channels, plus one framing or synchronizing bit at the end, are known as a frame. All 193 bits in the frame [(24*8)+1] are clocked on to the digital line every 125 microseconds. This process continues frame after frame.

Every sixth frame, the eighth bit, also known as the least significant bit (LSB), in each of the twenty-four channels is "robbed" and replaced by a supervisory signaling bit. This signaling bit is used to build codes which represent the DC supervisory signaling information for transmission over the digital line. Depending on how the 193-bit frames are formatted into larger groups, this bit can represent one of four possible positions in the signaling code word.

These larger groups of formats are standardized into two basic framing formats: Super Frame and Extended Super Frame (ESF). The Super Frame signaling format, described in Bell Publication 43801 and commonly known as the A-B signaling format, groups twelve consecutive frames into a "super frame". The robbed bit of each channel sample in the sixth frame is the "A" signaling bit and the robbed bit of each channel sample in the twelfth frame of the super frame is the "B" signaling bit. These two bits form an A-B code that is used to encode the metallic line DC signaling states onto the digital facility.

Figure 4:
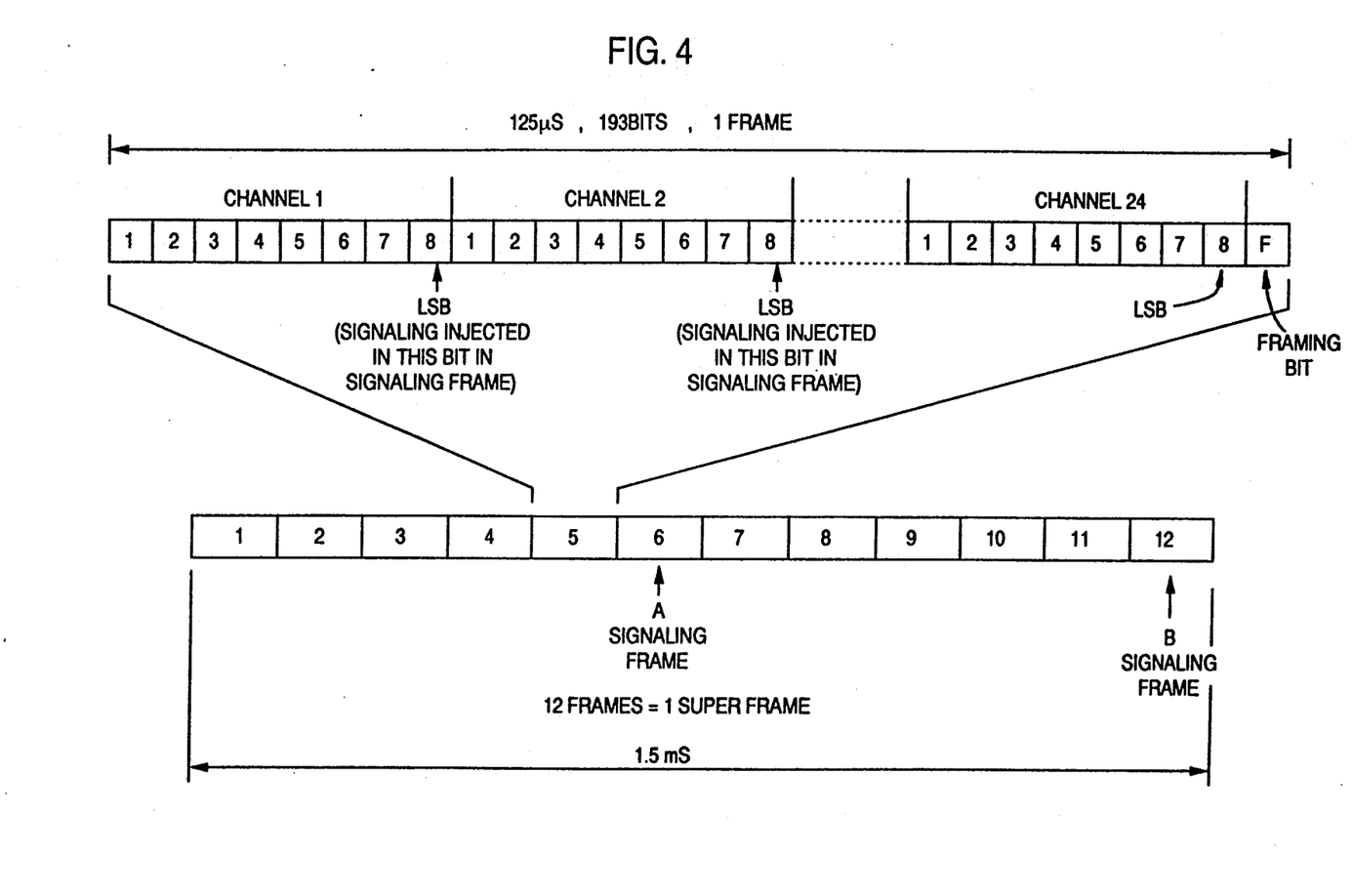
FIGS. 4 and 5 are diagrams illustrating, respectively, the Super Frame DS-1 format and the Extended Super Frame DS-1 format.
Figure 5:
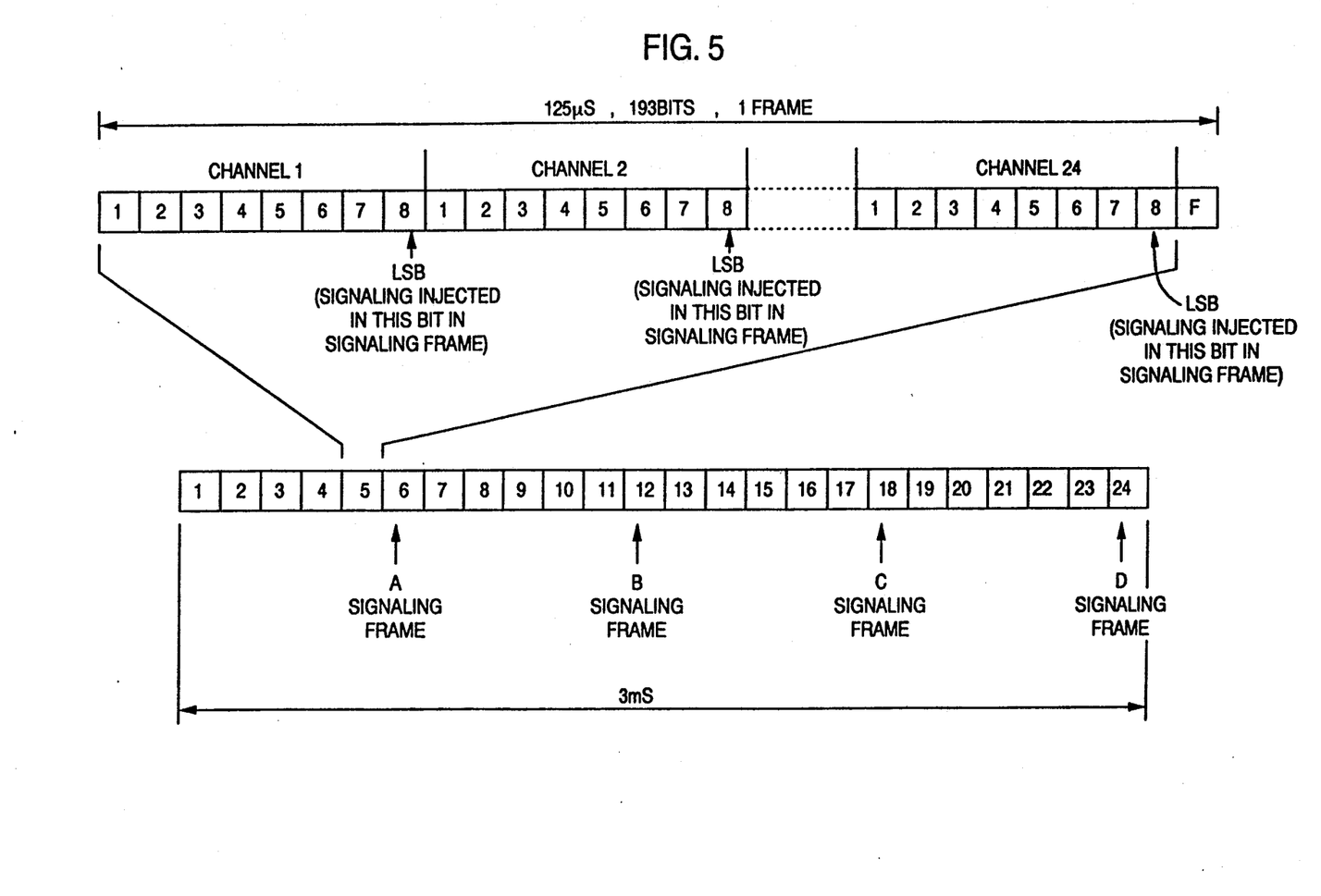

The ESF format, described in Bellcore Technical Reference TR-TSY000194 and commonly known as the A-B-C-D signaling format, groups twenty-four consecutive frames into an extended super frame. The robbed bit sample in the eighteenth frame of the extended super frame contains the additional "C" signaling bit, and the robbed bit sample in the twenty-fourth frame of the extended super frame the additional "D" signaling bit. These four bits form an A-B-C-D code which is used to encode the metallic-line DC supervisory signaling states onto the digital line. FIG. 4 shows the Super Frame DS-1 frame format, and FIG. 5 shows the ESF DS-1 frame format. The table in FIG. 6 shows the signaling codes normally used with POTS-type channel units.

In the lower portion of FIG. 4 is shown one superframe having twelve frames. In the upper portion of the figure, frame 5 is "expanded" as an illustration of the details of each channel word of 8 bits. Each of the 24 channels is substantially the same as each other in format although the information content of each may be unique. The 24 channels together, along with the framing bit, constitute the 193 bits of one frame. The LSB's in each channel of the sixth and twelfth frames are used for the A and B signalling bits of the codes shown in FIG. 6. The other LSB's in the other channels are used, along with the other bits, to encode the VF information.

FIG. 5 is arranged in a similar fashion as FIG. 4, showing the 24 frames of an extended superframe, frame 5 again being expanded to illustrate the arrangement and content of a single frame. In this case, the LSB's in each channel of the sixth, twelfth, eighteenth and twenty-fourth frames are used to create the A-B-C-D codes.

Figure 6:
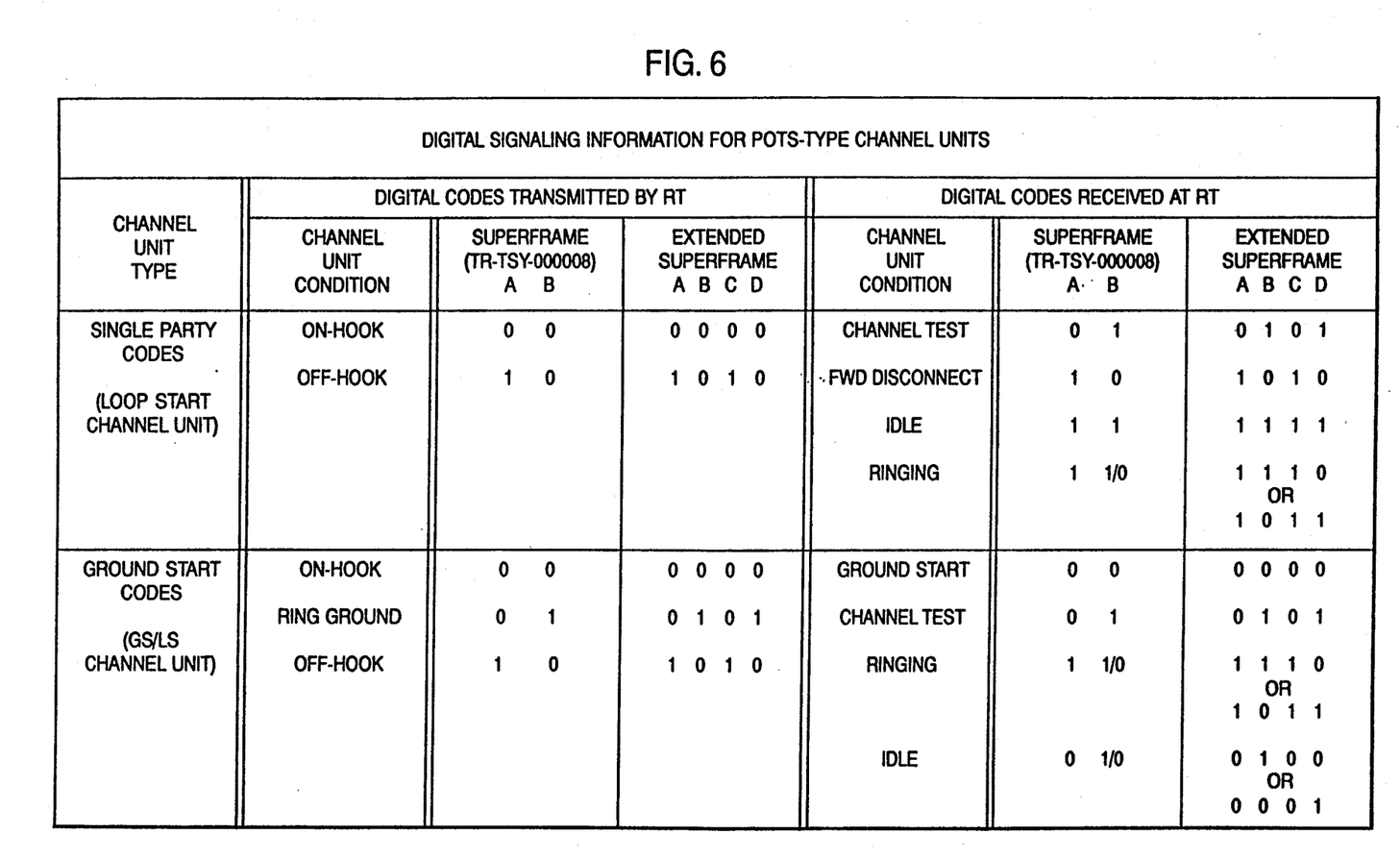
FIG. 6 is a table of the signaling codes normally used with POTS-type channel units.

The upper portion of FIG. 6 contains the codes which are used in connection with loop start channel units in single party mode and the lower portion shows those used in ground start mode with GS/LS channel units. The codes for both superframe and extended superframe formats are shown.

Figure 7:
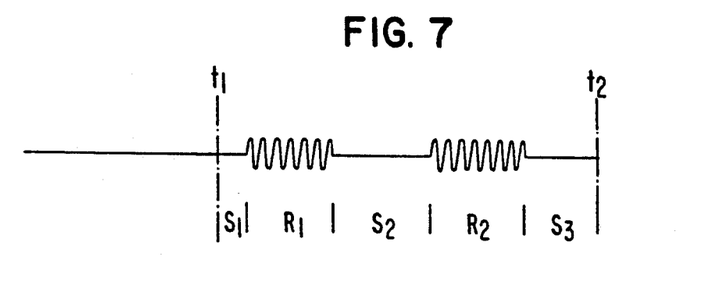
FIG. 7 is a time diagram of a typical ringing signal illustrating the relationship of ring and silent intervals.

Certain of the codes which are shown in FIG. 6 are associated with specific intervals as will be described with reference to FIG. 7 which shows a typical ringing sequence. The beginning of the ringing sequence is shown at time $t_1$. This initiation of the ringing sequence can occur anywhere relative to the bursts of energy which are the actual ringing signals and the location of $t_1$ in the Figure is chosen arbitrarily. Two ringing signals $R_1$ and $R_2$ are shown in FIG. 7 and the ringing sequence ends when the subscriber's instrument goes off-hook or if the party initiating the ringing goes on-hook at time $t_2$. Between, before and after the ringing signals are silent intervals $S_1$, $S_2$ and $S_3$.

Relating this pattern now to the table in FIG. 6, the codes identified as "Idle" codes are transmitted to the RT in a loop start signaling method during intervals $S_1$, $S_2$ and $S_3$. In LS circuits, the idle codes may also be transmitted to the RT before $t_1$ and after $t_2$.

Traditionally, transmission capability to a subscriber was required only while the subscriber was in the off-hook state. Or, stated conversely, this means there was no requirement for on-hook state transmission. For digital loop carrier systems employing the robbed-bit signaling method, this means no VF transmission was required while the RT channel unit was receiving the "Idle" or "Ringing" A-B or A-B-C-D codes from the CO end and sending the "On-Hook" code back.

However, recent advances in switching system capabilities have made it possible and desirable to transmit information to subscribers before they enter the off-hook state or, while they are on-hook, hence the term "On-hook Transmission" (OHT). The present invention provides a technique for transmitting data such as CPI or the like during intervals $S_2$ and $S_3$ while the telephone connected to the RT is still on-hook, a function which cannot be performed by the apparatus of the prior art. Typically, only $S_2$ is used for CPI. Silent intervals other than $S_2$ and $S_3$ can also be used.

Following is a summary of AT&T Technologies, Inc. SLC Series 5 POTS-type RT channel units, in chronological order of initial availability, showing their OHT capabilities.

| 1. | AUA51 (GS/LS) | No OHT |
|----|---------------|--------|
| 2. | AUA58 (LS)    | OHT when receiving "Ground Start - Idle" codes or "Single Party - Idle" codes (See FIG. 6 for codes). |
| 3. | AUA59 (GS/LS) | OHT only when receiving "Single Party - Idle" codes. |

The present invention provides OHT when receiving either single party or ground start codes.

More specifically, some of the prior art equipment had OHT capability only when receiving "Single Party - Idle" codes, not when receiving "Ground Start - Idle" codes. Other prior art equipment had no OHT. Typically, during the Ground Start ringing silent interval, the "Ground Start - Idle" code is sent to a Loop-Start/-Ground-Start POTS type channel unit manufactured by AT&T and identified as the AUA59. This means that the AUA59 will be unable to transmit VF information during the ringing silent interval on a ground start line or when connected to any device transmitting Ground Start codes. Therefore, the AT&T AUA59 is incompatible with and does not meet the requirements of Bellcore TR-TSY-000030.

Figure 8:
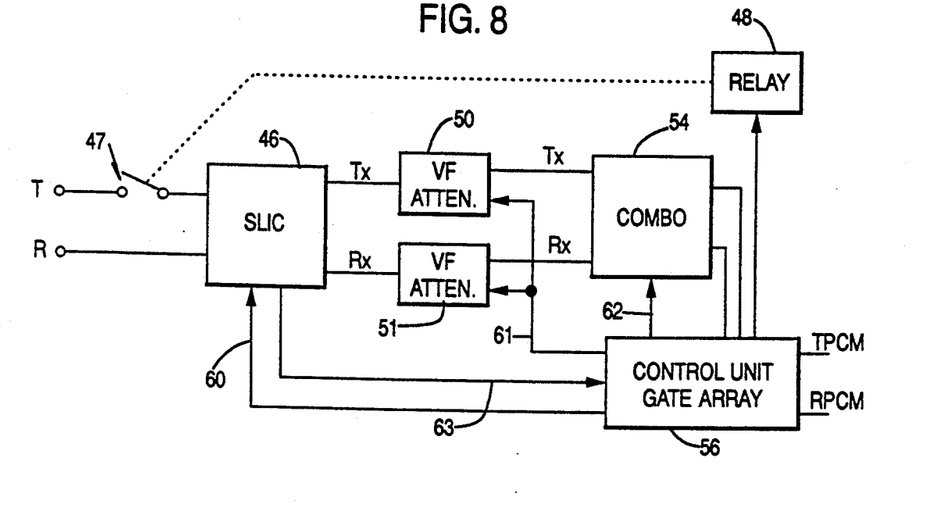
FIG. 8 is a schematic block diagram of an RT unit incorporating a command arrangement in accordance with the present invention.

FIG. 8 is simplified block diagram of one channel of a channel unit apparatus in accordance with the present invention. The tip and ring wires from a telephone instrument are connected to the input/output terminals of a subscriber line interface circuit (SLIC) unit 46, the tip conductor being connected through the contact set 47 of a relay 48. The contacts are normally in the open state for GS operation and normally in the closed state for LS operation, "normally" being used here to mean the state before a line is seized. The SLIC performs a 2 to 4-wire conversion and the separate transmit/receive paths are connected through the transmit and receive attenuators 50 and 51 to a combo unit 54, which is a combined PCM filter and codec (coder-decoder). One of the channels interconnecting these units is a transmit channel $T_x$ and the other is a receive channel $R_x$, as marked.

The transmit and receive paths from the combo unit 54 are connected to a control unit gate array device 56 and then to the transmit pulse code modulation (TPCM) and receive pulse code modulation (RPCM) lines of the common equipment. The gate array device 56 comprises a control unit which performs a number of control functions relating to the operation of the channel unit which are conventional, do not relate directly to the present invention and therefore will not be described.

However, in connection with the present invention, gate array device 56 produces a set of signals, in response to receipt of an idle code in a GS circuit to open up paths (i.e., make the paths complete) to insure information continuity of VF paths in the SLIC and the combo unit and the appropriate level of attenuation in attenuation circuits 50 and 51 so that OHT can take place. These signals are illustrated by the connections 60, 61 and 62 in FIG. 8. An off/on hook signal is supplied to gate array unit 56 on a line 63. In a preferred current embodiment, SLIC unit 46 is active except when receiving GS-GS codes (in FIG. 6, under "Channel Unit Condition", "Ground Start" in the Ground Start Codes section) when it is in a standby mode, or except when there is a serious fault in the system when it is powered down. The term "powered down" in this context means that it is put into a state in which it draws very little current and is waiting to be activated by an appropriate code or codes. It is not actually deenergized in a powered-down state.

Figure 9:
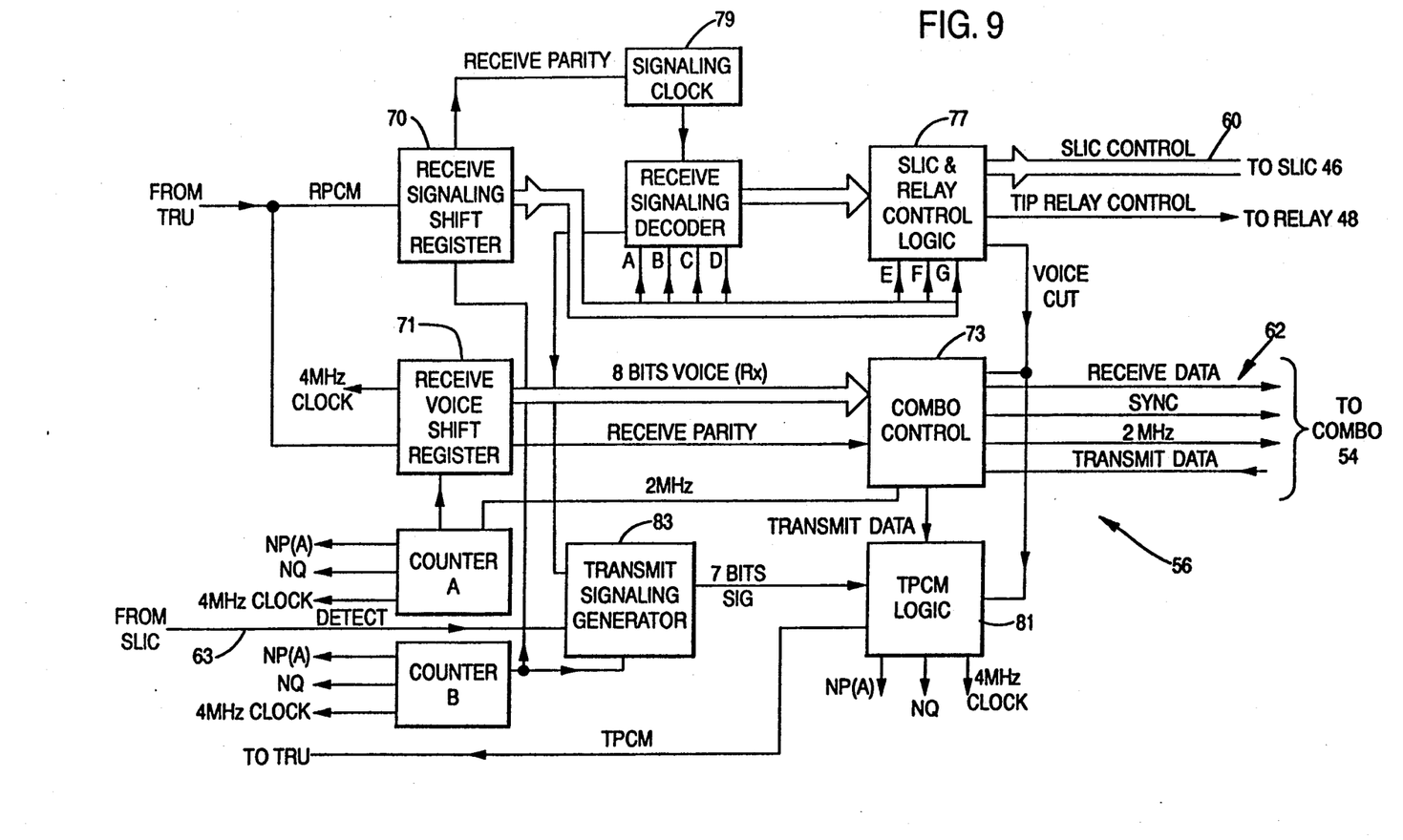
FIG. 9 is a schematic block diagram of relevant portions of a control unit usable in the RT unit of FIG. 8 to produce the control signals in accordance with the invention.
Figure 10:
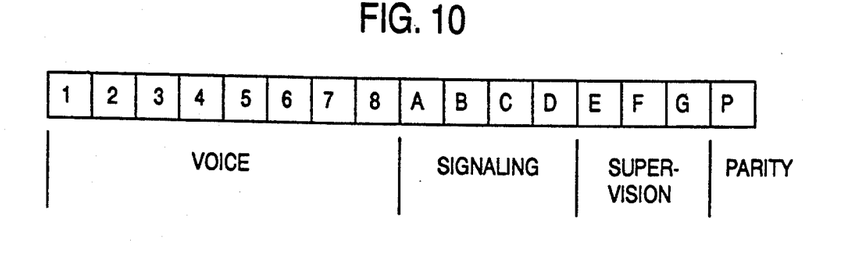
FIG. 10 is diagram illustrating the RPCM and TPCM 16-bit words which appear in the apparatus of FIGS. 8 and 9.

Referring now to FIG. 9 which shows relevant portions of gate array device 56, RPCM and TPCM are connected from the TRU to the channel unit logic circuits. The digital information is in 16 bit words and is fed serially to all the channel units in the digroup. FIG. 10 shows the format of each RPCM or TPCM 16 bit word. The first eight bits of the word contain the voice information, the 9th through 12th bits contain the A-B-C-D signalling information, the 13th through 15th bits contain digital line failure supervision information, and the last (16th) bit is a parity bit for error checking purposes.

Timing signals NPA, NPB and NQ are generated by the TRU to address each channel in each time slot. NPA specifically addresses the odd (A) channel of each channel unit and NPB specifically addresses the even (B) channel of each channel unit. As both odd and even channels are essentially identical in operation, only the odd (A) channel operation will be described. FIG. 9 is a block diagram of the gate array logic circuits which control the A channel voice and signaling.

RPCM from the TRU is serially fed to two shift registers, the Receive Signaling Shift Register 70 and the Receive Voice Shift Register 71.

During the correct time slot, a counter A allows the first eight bits of voice of the appropriate RPCM word to be clocked into the Receive Voice Shift Register 71 at a 4 MHz rate. Counter A also generates a 2 MHz clock for use by combo control circuits 73. The eight voice bits are sent in parallel to the combo control circuit and are converted back into a serial format to be clocked into the combo (Receive Data) at a 2 MHz rate. The Receive Voice Shift Register circuit 71 calculates RPCM parity and the result is fed to the Combo Control circuit. If a parity error is detected, receive data to and transmit data from the combo are interrupted.

During the correct time slot, counter B allows the last eight bits (9-16) of the appropriate RPCM word to be clocked into the Receive Signaling Shift Register 70 at a 4 MHz rate. The Receive Signaling Shift Register stores and then converts the bits into a parallel format and forwards bits 9-12 (A-B-C-D signaling) to a Receive Signaling Decoder 75 and bits 3-15 (E,F,and G) to the SLIC & Relay Control Logic circuit 77. The Receive Signaling Decoder 75 decodes bits 9-12 and sends instructions to the SLIC & Relay Control Logic 77 which controls the SLIC chip 46 and Tip Relay 48 (FIG. 8) accordingly. Receive Signaling Shift Register 70 detects parity and if the parity is bad, a Signaling Clock 79 is instructed to freeze the Receive Signaling Decoder 75 until good parity is received. The Receive Signaling Decoder 75 also instructs the SLIC & Relay Control circuit 77 to cut the voice path when the ground start code is received. The only other time the signaling bits cause the voice path to be interrupted is during a carrier failure at which time bits 13 and 15 (E and G bits) command the SLIC & Relay Control Logic circuit 77 to issue a voice cut command to the combo control circuit 73 and a TPCM logic circuit 81 and, of course, during ringing.

TPCM is serially sent from the TPCM Logic circuit to the TRU in 16 bit words during the appropriate time slot. The first 8 bits (voice information) of the 16 bit word are sent from the combo 54 (transmit data) via the Combo Control circuit 73 to the TPCM Logic circuit 81. Bits 9-15 are generated by a Transmit Signaling Generator 83 and sent in serial form to TPCM Logic circuit 81. The TPCM Logic circuit creates a parity bit (bit 16) and combines bits 1-16 for serial transmission at 4 MHz on the TPCM line.

It will be recognized by those skilled in this art that a gate array is not the only device which can be used to implement this invention although a gate array is certainly a preferred implementation. On the contrary, a dedicated microprocessor, a programmable processor or a hard-wired unit can be substituted for the gate array, so long as the appropriate signals are provided to complete the data path under the described conditions.

Following is a glossary identifying abbreviations commonly employed with reference to the equipment described herein:

| GLOSSARY | |
|---|---|
| CLASS | CUSTOM LOCAL AREA SIGNALING SERVICE |
| | (CLASS is a Service Mark of Bell Communication Research, Inc.) |
| CNI | CALLING NUMBER IDENTIFICATION |
| CO | CENTRAL OFFICE |
| COMBO | COMBINATION CODEC AND PCM FILTER |
| COT | CENTRAL OFFICE TERMINAL |
| CPI | CALLING PARTY IDENTIFICATION |
| CSA | CUSTOMER SERVING AREA |
| DLC | DIGITAL LOOP CARRIER |
| DS-1 | DIGITAL SIGNAL STANDARD, LEVEL 1 |
| GS | GROUND START |
| LIU | LINE INTERFACE UNIT |
| LS | LOOP START |
| OHT | ON-HOOK TRANSMISSION |
| PBX | PRIVATE BRANCH EXCHANGE |
| POTS | PLAIN OLD TELEPHONE SERVICE |
| RT | REMOTE TERMINAL |
| SLC | SUBSCRIBER LOOP CARRIER (SLC is a registered trademark of AT & T Technologies Inc.) |
| SLIC | SUBSCRIBER LOOP INTERFACE CIRCUIT |
| TDM | TIME DIVISION MULTIPLEX |
| TRU | TRANSIT RECEIVE UNIT |
| VF | VOICE FREQUENCY |

While certain advantageous embodiments have been chosen to illustrate the invention, it will be understood by those skilled in the art that various changes and modifications can be made therein without departing from the scope of the invention as defined in the appended claims.

What is claimed is:

1. A method of providing a voice frequency (VF) path for on-hook VF transmission through each of a plurality of channel units, each including a subscriber line interface circuit chip (SLIC), to a subscriber telephone instrument in a digital loop carrier (DLC) system for providing POTS-type telephone service using DC signalling to the subscriber telephone instrument comprising the steps of providing a control unit operatively associated with each channel unit for passing signals including VF and DC signals in both directions for transmit and receive communication channels, and generating with the control unit control signals for each channel unit for causing a portion of the channel unit to establish a communication path through each such portion in response to receipt by the control unit of an "idle" code in ground start mode during idle condition regardless of whether the subscriber instrument is on-hook or off-hook, thereby facilitating on-hook transmission.

2. An apparatus for providing a voice frequency (VF) path for on-hook VF transmission through each of a plurality of channel units, each including a subscriber line interface circuit chip (SLIC), to a subscriber telephone instrument in a digital loop carrier system for providing POTS-type telephone service using DC signalling to the subscriber telephone instrument comprising the combination of control unit means operatively associated with each channel unit for passing signals including VF and DC signals in both directions for transmit and receive communication channels, and means in each said control unit for generating control signals for said associated channel unit for establishing through a portion of the channel unit a communication path in response to receipt by said control unit means of an "idle" code in ground start mode during idle condition regardless of whether said subscriber instrument is on-hook or off-hook, thereby permitting on-hook transmission.

3. An apparatus according to claim 2 wherein said control unit means receives a receive pulse code modulation signal comprising a 16 bit word of which four bits form an ABCD signaling code, said control unit further comprising decoder means for generating said control signals in response to said "idle" code in said ABCD signaling code.

4. A method of providing a voice frequency (VF) path for on-hook signaling through each of a plurality of channel units, each including a subscriber line interface circuit chip (SLIC), to a subscriber telephone instrument in a digital loop carrier (DLC) system for providing POTS type telephone service using DC signaling to the subscriber telephone instrument comprising providing a control unit operatively associated with each channel unit for passing signals including VF and DC signals in both directions for transmit and receive communication channels, and generating, with the control unit, control signals for the associated channel unit for establishing a communication path through the associated channel unit in response to receipt by the control unit of an "idle" code in ground start mode during idle condition regardless of whether the subscriber instrument is on-hook or off-hook, thereby facilitating on-hook transmission.

5. An apparatus for providing a voice frequency (VF) path for on-hook signaling through each of a plurality of channel units, each including a subscriber line interface circuit chip (SLIC), to a subscriber telephone instrument in a digital loop carrier (DLC) system for providing POTS-type telephone service using DC signaling to the subscriber telephone instrument comprising the combination of control unit means operatively associated with each channel unit for passing signals including DC and VF signals in both directions for transmit and receive communication channels, and means in each said control unit for generating control signals for the channel unit for establishing through each portion of the channel unit a communication path in response to receipt by said control unit means of an "idle" code in ground start mode during idle condition regardless of whether the subscriber instrument is on-hook or off-hook, thereby permitting on-hook transmission.

6. An apparatus according to claim 5 wherein said control unit receives a receive pulse code modulation signal comprising a 16 bit word of which four bits form an ABCD signaling code, said control unit further comprising decoder means for generating said control signals in response to said "idle" code in said ABCD signaling code.

7. A digital loop carrier system comprising
a source of voice frequency (VF) signals;
a subscriber instrument having on-hook and off-hook states;
a remote terminal coupled to said subscriber instrument;
a plurality of channel units in said remote terminal for transmitting VF signals including VF and DC signals from said source to said instrument through said remote terminal, each of said channel units including a subscriber line interface circuit (SLIC) chip;

means coupled to each of said channel units for enabling said channel units to pass said VF signals through said remote terminal in response to a ground start idle code received by said means form said source in ground start mode during idle condition whereby said VF signals are transmitted to the subscriber whether the subscriber instrument is on-hook or off-hook.

8. A system according to claim 7 wherein said source is a central office terminal.

9. A system according to claim 7 wherein said source is a digital switching system.

10. A system according to claim 7 wherein said VF signals include special messages transmitted through said channel units to said instrument while said instrument is on-hook.

11. A system according to claim 7 wherein said means comprises a control circuit responsive to said ground start idle code.

12. A system according to claim 11 wherein said control circuit is a gate array.

13. A system according to claim 7 wherein said instrument has a tip lead and a ring lead and wherein said means enables said channel units when loop current flows between said tip and ring leads.

14. A system according to claim 13 wherein each said subscriber line interface circuit (SLIC) has a plurality of input terminals coupled to said ring and tip leads, respectively, and wherein said means coupled to each of said channel units includes a control for selectively connecting said tip lead to one of said input terminals of said SLIC.

15. An apparatus according to claim 2 wherein said "idle" code in ground start mode is received from a central office terminal, wherein said VF signals include special messages transmitted through said channel units to said instrument while said instrument is on-hook, said means in said control unit for producing said control signals comprises a gate array, wherein said instrument has a tip lead and a ring lead and wherein said means enables said channel units when loop current flows between said tip and ring leads, and wherein each said subscriber line interface circuit (SLIC) has a plurality of input terminals coupled to said ring and tip leads, respectively, and wherein said means in each said control unit includes means for selectively connecting said tip lead to one of said input terminals of said SLIC.

16. An apparatus according to claim 2 wherein said "idle" code in ground start mode is received from a digital switching system, wherein said VF signals include special messages transmitted through said channel units to said instrument while said instrument is on-hook, said means in said control unit for producing said control signals comprises a gate array, wherein said instrument has a tip lead and a ring lead and wherein said means enables said channel units when loop current flows between said tip and ring leads, and wherein each said subscriber line interface circuit (SLIC) has a plurality of input terminals coupled to said ring and tip leads, respectively, and wherein said means in each said control unit includes means for selectively connecting said tip lead to one of said input terminals of said SLIC.

17. A system according to claim 11 wherein said control circuit receives a receive pulse code modulation signal comprising a 16 bit word of which four bits form an ABCD signaling code, said control circuit further comprising decoder means for generating said control signals in response to said "idle" code in said ABCD signaling code.

* * * * *